(No Model.)
W. C. FISHER.
PNEUMATIC TIRE.
No. 498,777. Patented June 6, 1893.
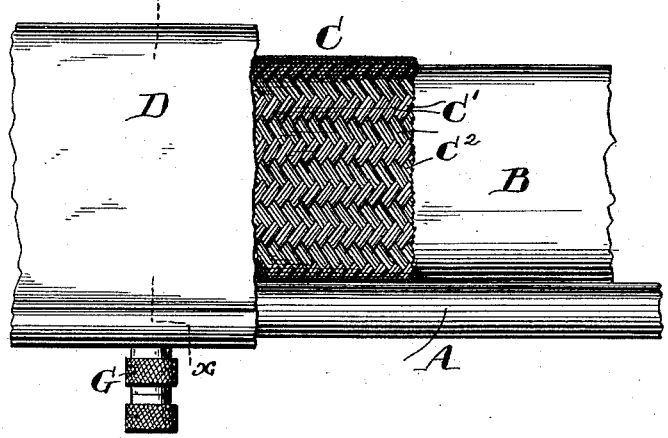
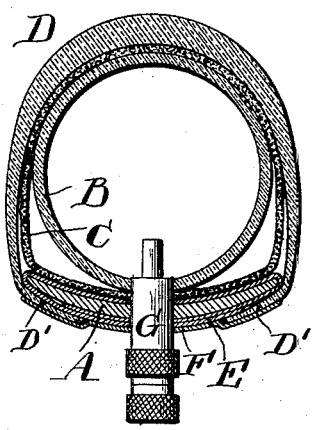
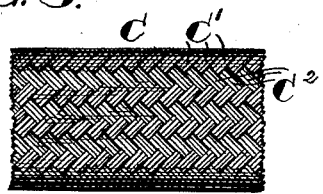
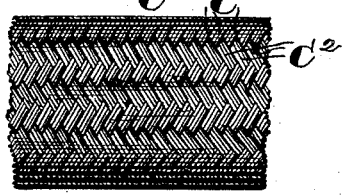
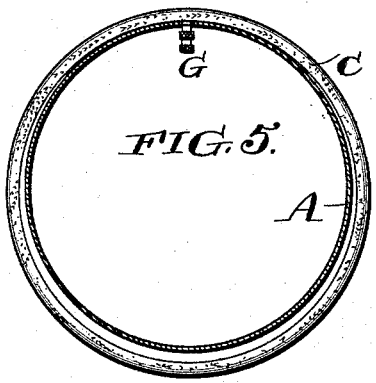
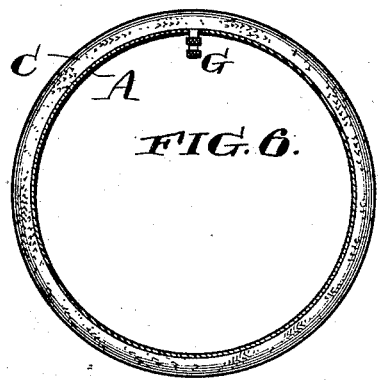
WITNESSES:
INVENTOR:
William C. Fisher
by his atty.

UNITED STATES PATENT OFFICE.

WILLIAM C. FISHER, OF MIDDLETOWN, CONNECTICUT, ASSIGNOR TO GEORGE R. BIDWELL, OF NEW YORK, N. Y.

PNEUMATIC TIRE.

SPECIFICATION forming part of Letters Patent No. 498,777, dated June 6, 1893.

Application filed October 22, 1892. Serial No. 449,568. (No model.)

*To all whom it may concern:*

Be it known that I, WILLIAM C. FISHER, of Middletown, county of Middlesex, State of Connecticut, have invented a certain new and useful Improvement in Pneumatic Wheel-Tires, of which the following is a true and exact description, reference being had to the accompanying drawings, which form a part of this specification.

My invention relates to pneumatic tires such as are used for bicycle and racing sulky wheels, the object of my invention being to provide a tire which will be simple and durable, and which will when inflated, automatically grip and hold fast to the wheel rim upon which it is placed. I accomplish these results by forming the tire proper of an inner expansible and air tight tube, (preferably rubber) and inclosing this tube in a tubular jacket formed of a braided fabric which is made up of oppositely inclined spirally running lines of threads, similar in character to the well known braided whip covers, the threads being so inclined, and being also free to move on each other that the diameter of the jacket can be increased by decreasing its length. Such a tire uninflated, or but partially inflated, can be readily slipped over the edges of a grooved wheel rim and will lie loosely in the groove thereof, but, when in this position, if more air is forced into the inner expansible tube, said tube will expand, and the braided jacket will expand freely with it while at the same time decreasing in length as the pitch of the spiral threads decreases. In this way the braided jacket will decrease in length until its further contraction is arrested by the rim, which will be firmly gripped by it, and which, by arresting its longitudinal contraction, will also prevent further expansion in diameter; the expansible jacket thus becoming non-expansible and preventing further expansion of the inner expansible tube.

Reference is now had to the drawings which illustrate my invention, and in which—

Figure 1, is a side elevation of a portion of a wheel rim provided with my improved tire, the parts of which are shown cut away in steps so as to show each of the constituent parts. Fig. 2, is a cross-section on the line $x$—$x$ of Fig. 1. Fig. 3, shows a section of my tubular jacket pulled out longitudinally. Fig. 4, is a similar section showing the jacket expanded and the spirals of the threads decreased in pitch. Fig. 5, is a side elevation showing a wheel rim and deflated tire placed around it, and Fig. 6, is a similar view showing the effect of inflating the tire.

A, is the wheel rim which is made concavely grooved as shown, and may have a groove of any desired depth.

B, is the inner expansible tire tube, preferably of rubber.

C, is the braided expansible jacket which is formed of two spirally running sets of threads, C' and $C^2$ braided together and the spirals running in opposite directions as shown. Preferably the jacket is formed of a seamless braided tube, and preferably also, the fabric is made as shown by braiding together a series of strands, each made up of two or more threads not twisted together but lying side by side in a flat band as shown in Figs. 1, 3 and 4 of the drawings.

D, is the wearing shoe, which is used to prevent injury to the tire proper, and is usually formed of rubber having a thickened tread portion as shown. I have shown the edges D' D' of the shoe as lapped over the inside of the wheel rim and covered by a finishing strip E, but the shoe can lie throughout in contact with the jacket C, and need not extend to the inside of the rim.

I have shown the rim A, as provided with a wrapping of fabric F, which should be cemented to the rim, and I have also shown the jacket C, as cemented to the rim or its wrapping, but while this increases the holding power of the tire it is not essential.

G, is the non-return air valve through which the tire is inflated and deflated.

The tire made up of tubes B and C is, in a wholly or partially deflated condition, placed around the rim as shown in Fig. 5, the threads of the braided jacket C, being pulled out so that their spirals will make long turns around the tube. Then the tire is inflated contracting around the rim as it increased in sectional diameter until it tightly grips the rim as shown in Fig. 6; being unable to further contract in length the jacket C can no longer expand in sectional diameter and the tire can be made as hard as may be desired by forcing air into it. Of course when it is desired to remove the tire it is only necessary to let the air escape when the length of jacket C can be increased so that it can readily be removed from the rim.

Having now described my invention, what I claim as new, and desire to secure by Letters Patent, is—

1. A pneumatic wheel tire having in combination with an inner expansible air tight tube an enveloping jacket inclosing said expansible tube but free to move thereon and formed of threads braided in such a manner that said jacket will expand freely and simultaneously contract in length.

2. A pneumatic wheel tire having in combination with an inner expansible air tight tube an enveloping jacket surrounding said tube and free to move thereon and formed of threads braided into a tube in such a manner that said tubular braided jacket will expand freely and at the same time contract in length.

3. A pneumatic wheel tire having in combination with an inner expansible air tight tube an enveloping-jacket surrounding said tube and formed of a series of sets of threads, said sets of threads being braided together so that the threads in each set will lie alongside of each other forming a flat band.

WILLIAM C. FISHER.

Witnesses:
E. K. HUBBARD,
H. W. HUBBARD.